United States Patent [19]

Mishima et al.

[11] Patent Number: 5,164,448
[45] Date of Patent: Nov. 17, 1992

[54] CURABLE UNSATURATED POLYESTER DRESIN COMPOSITION

[75] Inventors: Yasuhiro Mishima; Hisayuki Iwai, both of Aichi; Kenichi Nishino, Osaka; Sanzi Aoki, Nara; Mitsuo Kinoshita, Aichi; Tatsuhiko Ozaki, Aichi, all of Japan

[73] Assignees: Takeda Chemical Industries, Ltd., Osaka; Toyota Jidosha Kabushiki Kaisha; Takemoto Yushi Kabushiki Kaisha, both of Aichi, all of Japan

[21] Appl. No.: 762,250

[22] Filed: Sep. 19, 1991

Related U.S. Application Data

[63] Continuation-in-part of Ser. No. 693,076, Apr. 29, 1991, abandoned, which is a continuation of Ser. No. 449,511, Dec. 4, 1989, abandoned, which is a continuation-in-part of Ser. No. 232,433, Aug. 15, 1988, abandoned.

[30] Foreign Application Priority Data

Aug. 15, 1987 [JP] Japan .................. 62-203301

[51] Int. Cl.⁵ .............................................. C08L 67/06
[52] U.S. Cl. ..................................... 525/64; 523/522; 525/69; 525/90; 525/91
[58] Field of Search .................. 523/522; 525/69, 90, 525/91, 64

[56] References Cited

U.S. PATENT DOCUMENTS

| | | | |
|---|---|---|---|
| 3,705,208 | 12/1972 | Nakamuta | 525/171 |
| 4,670,485 | 6/1987 | Hesse | 523/522 |
| 4,851,474 | 7/1989 | Willis | 525/92 |

FOREIGN PATENT DOCUMENTS 1152682  8/1983  Canada .................. 525/44

*Primary Examiner*—Patricia A. Short
*Attorney, Agent, or Firm*—Heller, Ehrman, White & McAuliffe

[57] ABSTRACT

Curable unsaturated polyester resin compositions from which molded products with superior surface smoothness can be obtained include a block copolymer of a specified form, an unsaturated polyester, a vinyl monomer, a filler, a curing catalyst and a reinforcing fiber. The block copolymer is of the form $A-(B)_n$ where A is non-hydrogenated polyisoprene block having viscosity average molecular weight of 10000 or more, B is saturated polyester block obtainable by condensation of organic dicarboxylic anhydride and 1,2-epoxide, more than 50 mol % of terminal groups of the polyester block being carboxylic acid group, A and B are connected by ester linkage and n is not less than 2. Block copolymers of this type can be formed by starting with carboxylic acid or hydroxyl group in polyisoprene and by alternate condensation of organic dicarboxylic anhydride and 1,2-epoxide.

5 Claims, 1 Drawing Sheet

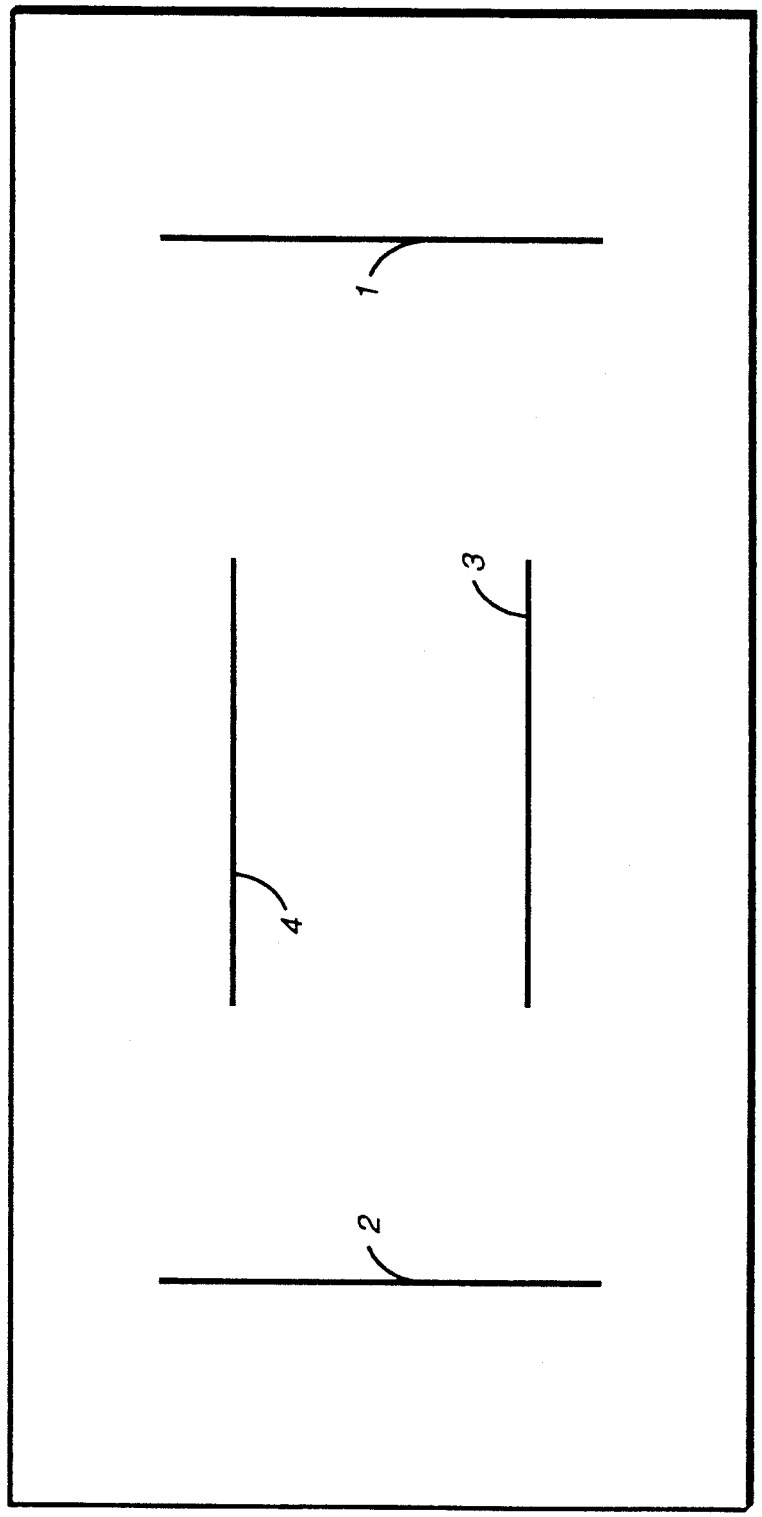

CURABLE UNSATURATED POLYESTER DRESIN COMPOSITION

This is a continuation-in-part of application Ser. No. 07/693,076 filed Apr. 29, 1991, now abandoned, which is a continuation of application Ser. No. 07/449,511 filed Dec. 4, 1989, now abandoned, which is a continuation-in-part of application Ser. No. 07/232,433 filed Aug. 15, 1988, now abandoned.

BACKGROUND OF THE INVENTION

This invention relates to curable unsaturated polyester resin compositions.

Fiber-reinforced plastics (FRP) have superior characteristics not only regarding mechanical strength, and heat, water and chemical resistance but also regarding productivity, and are used extensively for bathtubs, water tank panels and bathroom sinks. Recently, unsaturated polyester sheet molding compounds (SMC) and bulk molding compounds (BMC) are coming to be recognized as excellent plastic materials for automotive exterior body panels and are applied not only to exterior parts such as spoilers, air-intakes and rocker panels but also to main exterior panels such as engine hoods, roofs and trunk lids.

It is known, however, that thermosetting unsaturated polyester resins shrink significantly as they cure. For this reason, molded products of such resins tend to crack or warp. Glass fibers used as reinforcement tend to become easily visible and pinholes (porosity) appear to adversely affect the surface appearance and paintability. It is also a problem that they have inferior dimensional stability.

In view of the above, it has been known to mix thermoplastic resins such as polystyrene, polyvinylacetate, polymethyl methacrylate, and block copolymers of a conjugated diene monomer and an aromatic vinyl monomer as low profile additives to unsaturated polyester resins (29th National SAMPE Symposium, Apr. 3-5, 1984). Block copolymers of lactone and conjugated diene (U.S. Pat. Nos. 4,287,313 and 4,360,643) for improving compatibility and unsaturated polyester resin compositions with liquid polymer tougheners introduced into unsaturated matrix (U.S. Pat. No. 4,290,939 and Canadian Patent 1,152,682) have also been disclosed. There is yet to be discovered, however, any thermoplastic resin which is satisfactory from all points of view such as compatibility and dispersibility when mixed with unsaturated polyester resins and ability to reduce shrinkage and surface smoothness of products. At the present time, therefore, they are being used only for some, and not all, of these required characteristics. Since molding compounds applied to automotive exterior body panels, in particular, are required to give surface qualities comparable to those of a steel sheet, unsaturated polyester resin compounds containing known thermoplastic resins as low profile additives are hardly satisfactory.

The present inventors have already disclosed some curable unsaturated polyester resin compositions in view of the above (Japanese Patent Publications Tokkai 62-195041, 63-3056 and 63-6048 and U.S. patent application Ser. No. 013,905). Although these compositions have low shrinkage and improved strength, there still remain problems regarding surface smoothness and paintability.

SUMMARY OF THE INVENTION

It is therefore a general object of the present invention to provide unsaturated polyester resin compositions with which the aforementioned problems of prior art compositions can be eliminated. It is a particular object of the present invention to provide molding materials with superior characteristics such as surface smoothness and paintability when applied to automotive exterior body panels.

The present invention has been completed by the present inventors as a result of their diligent studies in view of the above and other objects and is based on their discovery that thermosetting unsaturated polyester resin compositions containing block copolymer with both a saturated polyester block and a non-hydrogenated polyisoprene block have not only superior characteristics regarding mechanical strength and heat, water and chemical resistance but also surface smoothness and paintability which are necessary when applied to automotive exterior body panels.

BRIEF DESCRIPTION OF THE DRAWING

The accompanying FIGURE which shows a method of measuring surface smoothness is incorporated in and forms a part of the specification and, together with the description, serves to explain the invention.

DETAILED DESCRIPTION OF THE INVENTION

This invention relates to curable unsaturated polyester resin compositions characterized as comprising a block copolymer of the from A-(-B)$_n$ an unsaturated polyester, a vinyl monomar, a filler, a curing catalyst and a reinforcing fiber, where A is non-hydrogenated polyisoprene block with viscosity average molecular weight of 10000 or greater, B is saturated polyester block obtained by condensation of organic dicarboxylic anhydride and 1,2-epoxide, more than 50 mol % of the terminal groups of this polyester block being carboxylic acid group, A and B are connected by ester linkage, n is an integer not less than 2, and A-(-B)$_n$ is obtained by starting with hydroxyl group or carboxylic acid group in modified polyisoprene and by alternate condensation of the above-mentioned organic dicarboxylic anhydride and 1,2-epoxide therewith in the presence of a catalyst.

Aforementioned block copolymers of the present invention can be obtained in an industrially advantageous manner by using modified polyisoprene of viscosity average molecular weight of 10000 or greater with hydroxyl and carboxylic acid groups within its molecule as starting substance and causing it to react with an organic dicarboxylic anhydride and 1,2-epoxide alternately in the presence of a catalyst. The organic dicarboxylic anhydride selectively reacts with the hydroxyl groups of the modified polyisoprene and the 1,2-epoxide selectively reacts with the carboxylic acid groups of the modified polyisoprene to form an ester. The terminal carboxylic acid groups or hydroxyl groups of the ester thus produced react sequentially with 1,2-epoxide or organic dicarboxylic anhydride, respectively, to form a polyester block. As starting material for obtaining the block copolymers of the present invention, hydroxyl or carboxyl modified polyisoprenes having two or more hydroxyl or carboxylic acid groups in the molecule can be used. The hydroxyl and carboxylic acid groups in modified polyisoprene are directly connected to the polyisoprene chain and they may be at any position of the chain. Regarding hydroxyl or carboxyl modified polyisoprene, its stereoisomerism and structural isomerism caused by different polymerization methods such as radical polymerization, ionic polymerization and living polymerization are not intended to limit the scope of this invention.

Examples of modified polyisoprene which can be used advantageously for the purpose of the present invention include Kuraprene LIR-503 (hydroxyl modified polyisoprene with viscosity average molecular weight of 25000 and 2.5 hydroxyl groups/molecule), Kuraprene LIR-506 (hydroxyl modified polyisoprene with viscosity average molecular weight of 25000 and 5.9 hydroxyl groups/molecule), Kuraprene LIR-403 (carboxyl modified polyisoprene with viscosity average molecular weight of 25000 and 3 carboxylic groups/molecule) and Kuraprene LIR-410 (carboxyl modified polyisoprene with viscosity average molecular weight of 25000 and 10 carboxylic groups/molecule). All of them are products of Kuraray Co., Ltd. of Japan.

Examples of organic dicarboxylic anhydride for the reaction referenced above include succinic anhydride, phthalic anhydride and hexahydrophthalic anhydride. Likewise, examples of 1,2-epoxide for the aforementioned reaction include ethylene oxide, propylene oxide and 1,2-butylene oxide, propylene oxide being preferable. Examples of the aforementioned catalyst include lithium halides such as lithium chloride and lithium bromide and tetralkyl quaternary ammonium salts such as tetramethyl ammonium bromide, tributylmethyl ammonium bromide and tetrapropyl ammonium chloride. In connection with the above, it is to be noted that these examples are intended to be illustrative and not to limit the scope of the present invention. The fundamental concept of the present invention is to use a particular kind of block copolymers in order to improve the surface quality of molded products by making use of basic characteristics of polyisoprene compounds and at the same time controlling their compatibility and/or dispersibility with thermosetting unsaturated polyester resins. Polyester blocks for these block copolymers can be appropriately selected, depending on the type of thermosetting unsaturated polyester resins to be used together. Polypropylene phthalate and polypropylene phthalate-succinate are examples of polyester block which are generally preferred with relatively many kinds of thermosetting unsaturated polyester resins.

Terminal groups of saturated polyester blocks of the block copolymers as synthesized above are usually mixtures of hydroxyl groups and carboxylic acid groups. Moreover, the aforementioned hydroxyl groups of polyester blocks serve to cause a reaction with dicarboxylic acid anhydride, and carboxylic acid groups should be introduced in the ratio of more than 50 mol % as terminal groups of polyester blocks. Examples of dicarboxylic acid anhydride which may preferably be used include succinic anhydride, phthalic anhydride and their mixtures. In the case of compositions for SMC or BMC to which magnesium oxide or magnesium hydroxide is added as a thickener, however, it is preferable to increase the ratio of carboxylic acid groups among the terminal groups from up to more than 75 mol % the point of view of stability of the compound and improved characteristics of molded products obtained therefrom.

The ratio of saturated polyester blocks in the block copolymer also affects its compatibility and dispersibility with thermosetting unsaturated polyester resins. In general, if the ratio of polyester blocks is increased, compatibility and dispersibility improve. In reverse, if the ratio is reduced, compatibility and dispersibility decrease.

As stated above, a principal object of the present invention is to improve the surface quality of molded products. To achieve this object the viscosity average molecular weight of the non-hydrogenated polyisoprene block in the block copolymer should preferably be in the range of from 20000 to 50000 and there should preferably be 2 or more, and preferably from 2.5 to 6 polyester blocks per polyisoprene block. The ratio of polyisoprene blocks in the block copolymer should therefore be made as high as allowable in view of the compatibility and dispersibility requirements. In general, the ratio of polyisoprene blocks in block copolymers to be used in the compositions of the present invention should preferably be in the range from 40 to 95 wt %, and more preferably from 70 to 90 wt %.

Block copolymers of the present invention are usually made into an olefinic unsaturated monomer solution in the range from 25 to 40% concentration such as a styrene monomer solution and such a solution is usually used by mixing with a thermosetting unsaturated polyester resin at the rate of from 20 to 50%. Some block copolymers are not required to be preliminarily dissolved in an olefinic unsaturated monomer such as styrene monomer before they are added to a thermosetting unsaturated polyester resin. Such block copolymers may be added after a specified amount of olefinic unsaturated monomer is added to a thermosetting unsaturated polyester resin.

Unsaturated polyesters used for the purpose of the present invention may be obtained by condensation of $\alpha,\beta$-olefinic unsaturated dicarboxylic acid and glycol. Saturated dicarboxylic acid or aromatic dicarboxylic acid may be used supplementarily as dibasic carboxylic acid. Dicylcopentadiene or the like which reacts with carboxylic acid may also be used together with glycol. Examples of $\alpha,\beta$-olefinic unsaturated dicarboxylic acid include maleic acid, fumaric acid, itaconic acid, citraconic acid and anhydrides of these dicarboxylic acids. Examples of dicarboxylic acid which may be used supplementarily include adipic acid, sebacic acid, succinic acid, glutaric acid, phthalic anhydride, o-phthalic acid, isophthalic acid, terephthalic acid, tetrahydrophthalic acid, and tetrachlorophthalic acid. Examples of glycol include alkanediol, oxyalkanediol and ethylene oxide or propylene oxide adducts of bisphenol A. Additionally, monovalent or trivalent alcohol may be used supplementarily. Examples of alkanediol include ethylene glycol, 1,2-propylene glycol, 1,3-propylene glycol, 1,3-butanediol, 1,4-butanediol, neopentyl glycol, 1,5-pentanediol, 1,6-hexanediol and cyclohexanediol. Examples of oxalkanediol include dioxyethylene glycol and trioxyethylene glycol. Examples of monovalent and trivalent alcohol include octyl alcohol, oleyl alcohol and trimethylol propane.

Synthesis of unsaturated polyester usually takes place with heating while water as a by-product is removed. Its average molecular weight is usually from 800 to 4000 and its acid value is from 20 to 60.

Examples of olefinic unsaturated monomer which may be used in connection with the present invention include styrene, p-chlorostyrene, vinyl toluene, divinyl benzene and esters of acrylic acid or methacrylic acid with alcohol with from 1 to 18 carbon atoms such as methyl methacrylate, butyl acrylate, hydroxypropyl acrylate, hydroxypropyl methacrylate and trimethylolpropane trimethacrylate. Examples of fillers which may be used in connection with the present invention include calcium carbonate, talc, silica, clay, glass powder and glass balloons. As for curing catalysts which may be used in connection with the present invention, may be anything which is dissociated at from 80° to 200° C. to generate radicals and to initiate polymerization of unsaturated polyesters and olefinic unsaturated monomers. Examples of such curing catalysts include t-butyl peroxyoctoate, t-butylperoxybenzoate, 1,1-bis(t-butylperoxy)-3,3,5-trimethylcyclohexane, t-butylperoxy 2-ethylhexyl carbonate and dicumyl peroxide. Examples of reinforcing fiber which may be used in connection with the present invention include glass fibers, carbon fibers, polyamide fibers, polyvinyl acetal fibers, polyester fibers, and boron fibers. If necessary, furthermore, pigments such as titanium dioxide, carbon black, iron oxide red and phthalocyanine blue, mold release agents such as zinc stearate and calcium stearate, thickeners such as magnesium oxide, magnesium hydroxide, calcium oxide and calcium hydroxide and agents of other types such as those for accelerating or retarding the curing, heat-resistant stabilizers and weather-resistant stabilizers.

Next, tests on block copolymers both embodying and not embodying the present invention are described in order to more clearly explain the present invention.

TESTS

Placed inside an autoclave were 480 g of carboxyl modified polyisoprene with viscosity average molecular weight of 25000 Kuraprene LIR-403 with average 3 COOH groups/molecule and measured acid value of 8.3, produced by Kuraray Co., Inc., 148 g (1 mol) of phthalic anhydride, 300 g of xylene and 0.5 g of lithium chloride as catalyst. After an atmosphere of nitrogen gas is prepared, the mixture was heated to 140° C. with stirring. Next, 61 g (1.05 mol) of propylene oxide was infused at 140° C. over a period of one hour. After three hours of aging at this temperature, the reaction was completed and 684 g of a light brown transparent liquid product was obtained by removing xylene. The ratio of the polyisoprene block in the polyisoprene-polyester block copolymer was 70 wt %. Its acid value was 1.6 and its hydroxyl value was 4.3.

Next, 300 g of the block co-polymer thus obtained, 2.1 g of succinic anhydride and 120 g of xylene were placed inside a flask provided with a Dimroth condenser, a thermometer and a stirrer, and were heated to 140° C. with stirring in a nitrogen flow. After aging was done for two hours at this temperature and the reaction was completed, xylene was removed and a light brown transparent liquid product (Example E in Table 1) was obtained. The ratio of the polyisoprene block in this polyisoprene-polyester block copolymer thus obtained was 69.5 wt %. Its acid value was 4.7 and its hydroxyl value was 1.1. The ratio of carboxylic acid groups among the terminal groups was 81.0 mol %.

Similarly, the block copolymers (Examples A–D in Table 1) were obtained. As can be seen clearly in Table 1, they are all end carboxyl modified block copolymers.

For the purpose of comparison, block copolymers (Comparison Examples G and H) not embodying the present invention as shown in Table 2 were also prepared similarly, and sheet molding compounds with composition as shown in Table 3 were prepared by using each of the block copolymers A–E shown in Table 1 and G and H shown in Table 2. Unsaturated polyester X in Table 3 was synthesized from 0.8 mol of maleic acid abhydride, 0.2 mol of isophthalic acid and 1.0 mol of propylene glycol. It contained 40 wt % of styrene, its acid value was 18.0 and its viscosity at 25° C. was 1210 cps. Plates were molded from these SMCs under the following conditions:

Mold Temperature: 145° C.
SMC coverage ratio: 40%
Pressure: 100 kg/cm$^2$
Cure time: 180 seconds
Dimensions of molded plate: 500×1000×2$^t$ mm Surface smoothness of these molded plates was measured along four lines 1, 2, 3 and 4 shown in FIGURE. The surfaces were measured at 300 points (pitch=1 mm) on each of these lines, fifth-order regression curves were calculated from these points and the average deviations ($\mu$) of the individual measurement points were obtained. The average values of the individual average deviations on the lines 1–4 were used as the measure of surface smoothness. Table 4 shows the surface smoothness of these SMC molded plates each containing one of the block copolymers shown in Tables 1 and 2. It is clearly seen that the compositions according to the present invention have superior surface smoothness.

In a next series of tests, sheet molding compounds with composition as shown in Table 5 were prepared by using the block copolymers A, B, D and E shown in Table 1 and G and H shown in Table 2. Unsaturated polyester Y in Table 5 was synthesized from 0.7 mol of propylene glycol, 0.3 mol of dicyclopentadiene and 1.0 mol of maleic acid anhydride. It contained 35 wt % of styrene, its acid value was 21.0 and its viscosity at 25° C. was 950 cps. Molded plates were prepared from the SMCs thus obtained as explained above and their surface smoothness was measured. In addition, these molded plates were coated with two component acrylic urethane primers and after they were baked at 120° C. for 30 minutes, their adhesion was examined by crosshatch tests. Table 6 shows the test results. It is clear that the compositions embodying the present invention all show superior surface smoothness and paintability.

In summary, compositions of the present invention serve to provide superior characteristics such as surface smoothness and paintability to molded products obtainable therefrom.

TABLE 1

| Example | Modified Polyisoprene (g) | Polyester Block *1 mol ratio (g) | *2 (g) | Modifier of Terminal Group (g) | Ratio of Polyisoprene blocks wt % | Terminal Group mol ratio |
| --- | --- | --- | --- | --- | --- | --- |
| A | *3 (1000) | SA (71) | EO (31) | SA (10) | 90 | COOH/OH 96.2/3.8 |
| B | *3 (1000) | SA (152) | PO (88) | SA (10) | 80 | COOH/OH 94.4/5.6 |
| C | *4 (1000) | HPA (125) | PO (42) | SA (9) | 85 | COOH/OH 75.5/24.5 |

TABLE 1-continued

| Example | Modified Polyisoprene (g) | Polyester Block *1 mol ratio (g) | *2 (g) | Modifier of Terminal Group (g) | Ratio of Polyisoprene blocks wt % | Terminal Group mol ratio |
| --- | --- | --- | --- | --- | --- | --- |
| D | *3 (1000) | SA/PA 1/1 (67/99) | PO (77) | SA (10) | 80 | COOH/OH 97.5/2.5 |
| E | *5 (1000) | PA (308) | PO (127) | SA (10) | 69.5 | COOH/OH 81.0/19.0 |

Notes:
*1 Organic dicarboxylic anhydride
*2 1,2-epoxide
*3 Hydroxyl modified polisoprene with average viscometric molecular weight of 25000 and 2.5 hydroxyl groups/molecule
*4 Hydroxyl modified polyisoprene with average viscometric molecular weight of 49000 and 6.0 hydroxyl groups/molecule
*5 Carboxyl modified polyisoprene with average viscometric molecular weight of 25000 and 3.0 carboxylic acid groups/molecule
SA Succinic anhydride
HPA Hexahydrophthalic anhydride
PA Phthalic anhydride
EO Ethylene oxide
PO Propylene oxide

TABLE 2

| Example | Modified Polydiene (g) | Polyester Block *1 (g) | *2 (g) | Modifier of Terminal Group (g) | Ratio of Polydiene block wt % | Terminal Group mol ratio |
| --- | --- | --- | --- | --- | --- | --- |
| G | *6 (1000) | PA (294) | PO (95) | SA (40) | 70 | COOH/OH 97.2/2.8 |
| H | *7 (1000) | SA (208) | PO (121) | SA (100) | 70 | COOH/OH 96.4/3.6 |

Notes:
*6 Polyisoprene glycol with average molecular weight of 5000
*7 Polybutadiene glycol with average molecular weight of 2000

TABLE 3

| Unsaturated polyester X | 50 parts by weight |
| --- | --- |
| Block copolymer | 15 parts by weight |
| Styrene | 35 parts by weight |
| Calcium carbonate | 150 parts by weight |
| t-butylperoxy benzonate | 1.5 parts by weight |
| Zinc stearate | 4.0 parts by weight |
| Magnesium oxide | 1.0 parts by weight |
| Glass fibers (length 2.5 cm) | 100 parts by weight |

TABLE 4

| | Block Copolymer in SMC | Surface Smoothness (μ) |
| --- | --- | --- |
| Example 1 | A | 5.8 |
| Example 2 | B | 2.5 |
| Example 3 | C | 4.3 |
| Example 4 | D | 2.1 |
| Example 5 | E | 1.5 |
| Comparison 1 | G | 8.9 |
| Comparison 2 | H | 11.2 |

TABLE 5

| Unsaturated Polyester Y | 50 parts by weight |
| --- | --- |
| Block copolymers | 15 parts by weight |
| Styrene | 35 parts by weight |
| Calcium Carbonate | 200 parts by weight |
| 1,1-bis(t-butylperoxy) 3,3,5-trimethyl cyclohexane | 1.0 parts by weight |
| Zinc stearate | 4.0 parts by weight |
| Magnesium oxide | 1.0 parts by weight |
| Glass fibers (length 2.5 cm) | 110 parts by weight |

TABLE 6

| | Block Copolymer in SMC | Surface Smoothness (μ) |
| --- | --- | --- |

TABLE 6-continued

| Example 6 | A | 4.5 |
| --- | --- | --- |
| Example 7 | B | 3.1 |
| Example 8 | D | 2.5 |
| Example 9 | E | 2.0 |
| Comparison 3 | G | 9.0 |
| Comparison 4 | H | 13.5 |

| | Paintability | |
| --- | --- | --- |
| | Pin Holes | Adhesion |
| Example 6 | None | 100/100 |
| Example 7 | None | 100/100 |
| Example 8 | None | 100/100 |
| Example 9 | None | 100/100 |
| Comparison 3 | Almost none | 98/100 |
| Comparison 4 | Slightly noticeable | 91/100 |

What is claimed is:

1. A curable unsaturated polyester resin composition comprising
a block copolymer of the form A–(B)$_n$,
an unsaturated polyester,
a vinyl monomer,
a filler,
a curing catalyst, and
reinforcing fibers,
where A is non-hydrogenated polyisoprene block with viscosity average molecular weight of 10000 or greater, B is saturated polyester block obtained by condensation of organic dicarboxylic anhydride and 1,2-epoxide, said organic dicarboxylic anhydride being one or more selected from the group consisting of succinic anhydride, phthalic anhydride and hexahydrophthalic anhydride, more than 50 mol % of terminal groups of said saturated polyester block being carboxylic acid group, A and B are connected by ester linkage, n is an integer not less than 2, and A–(B)$_n$ is obtained by starting with hydroxyl group or carboxylic acid group in modified non-hydrogenated polyisoprene and by alternate condensation of said organic dicarboxylic anhydride and said 1,2-epoxide therewith in the presence of a catalyst.

2. The composition of claim 1 wherein said terminal carboxylic acid group is formed by reaction of succinic and/or phthalic anhydride with a terminal hydroxyl group of said polyester block.

3. The composition of claim 1 wherein the viscosity average molecular weight of said polyisoprene block A is from 20000 to 50000 and n is between 2 and 10.

4. The composition of claim 1 wherein said polyisoprene block is in the range from 40 to 95 wt % of said block copolymer.

5. The composition of claim 1 wherein said 1,2-epoxide is propylene oxide.

* * * * *